United States Patent [19]
Ohta et al.

[11] Patent Number: 5,673,128
[45] Date of Patent: Sep. 30, 1997

[54] BACK LIGHT DEVICE OF LIQUID CRYSTAL DEVICE

[75] Inventors: Youko Ohta, Kashiba; Hirohide Terasaki, Tenri, both of Japan

[73] Assignee: Sharp Kabushiki Kaisha, Osaka, Japan

[21] Appl. No.: 580,302

[22] Filed: Dec. 28, 1995

[30] Foreign Application Priority Data

Jan. 31, 1995 [JP] Japan .................................. 7-014448

[51] Int. Cl.⁶ .................................................. G02F 1/1335
[52] U.S. Cl. .............................. 349/62; 349/61; 349/67; 349/70; 349/65
[58] Field of Search .................................. 359/48, 49, 50, 359/70; 362/27, 31, 32; 385/33, 129, 901, 146; 349/61, 62, 67, 70, 65

[56] References Cited

U.S. PATENT DOCUMENTS

| | | | |
|---|---|---|---|
| 2,712,593 | 7/1955 | Merchant | 362/27 |
| 4,936,659 | 6/1990 | Anderson et al. | 359/49 |
| 4,974,122 | 11/1990 | Shaw | 362/31 |
| 5,050,946 | 9/1991 | Hathaway et al. | 385/33 |
| 5,123,077 | 6/1992 | Endo et al. | 385/129 |
| 5,202,950 | 4/1993 | Arego et al. | 359/50 |

FOREIGN PATENT DOCUMENTS

| | | |
|---|---|---|
| 5-45651 | 2/1993 | Japan . |
| 5-107542 | 4/1993 | Japan . |
| 5-55103 | 7/1993 | Japan . |
| 5-224019 | 9/1993 | Japan . |
| 5-303017 | 11/1993 | Japan . |

*Primary Examiner*—William L. Sikes
*Assistant Examiner*—Julie Ngo

[57] ABSTRACT

A back light device of a liquid crystal display device includes fluorescent tubes on both ends of a light guiding plate. When viewed from a section which is perpendicular to the fluorescent tubes, shapes or internal constitution of the light guiding plate are asymmetrical in order to prevent irregularity of the luminance of a display area of a liquid crystal display panel caused by, e.g., a different in optical characteristics between the fluorescent tubes, a difference between positioning of each fluorescent tubes and the light guiding plate. In other words, a border of the shapes or of the internal constitution of the light guiding plate is set in a position that is nearer to the section where a quantity of incident light is relatively small according to a ratio of the quantities of incident lights on each section obtained by cutting a face that intersect a circumferential end of the display area on the light guiding plate at right angles. As a result, the display area on the liquid crystal display panel is prevented from becoming dark on the section side where a quantity of incident light is smaller.

22 Claims, 18 Drawing Sheets

BACK LIGHT DEVICE OF LIQUID CRYSTAL DEVICE

FIELD OF THE INVENTION

The present invention relates to a constitution of a back light device that is provided to a liquid crystal display device and illuminates a display area of a liquid crystal display panel by means of a light from the back of the liquid crystal display panel, and more specifically, relates to a back light device adopting a so-called edge light method.

BACKGROUND OF THE INVENTION

A liquid crystal display device including a back light device on the back of a liquid crystal display panel, namely, a liquid crystal display device adopting a back light method has been in common use. Such a back light device irradiates a light to a liquid crystal display panel so as to illuminate a display area of the liquid crystal display panel.

In recent years, as one example of such a back light device, a back light device adopting an edge light method is known. In such a back light device adopting the edge light method, a linear light source, such as a fluorescent tube, is mounted along a side edge face of a light guiding plate made of acrylic with excellent light transmitting properties, or the like. A light enters the light guiding plate from the linear light source is multiple-reflected in the light guiding plate and is emitted from the emitting face of the light guiding plate. In this manner, such a light guiding plate functions as a surface light source.

In addition, a back light device adopting the edge light method, which is arranged such that linear light sources are placed on a plurality of edge faces of a light guiding plate in order to obtain higher luminance, is also known. In accordance with the arrangement, as a result of comparison of the above arrangement with an arrangement that a light source is provided to only one end face, total quantities of lights entering to the light guiding plate increases in substantially proportion to a number of end faces on which light sources are provided. Logically, as a number of light sources increase, the luminance of a display area on a liquid crystal panel can be further improved. However, in consideration for reduction in a size, a thickness and producing cost of a liquid crystal display device, an arrangement that linear light sources are placed along two countered end faces has been dominant.

In the above arrangement, various procedures are considered in order to uniformly illuminate a display area of a liquid crystal display panel. As an arrangement that is similar to that disclosed in Japanese Unexamined Patent Publication No.5-107542/1993 or No. 5-224019/1993 (Tokukaihei 5-107542 or 5-224019), for example, as shown in FIG. 13, an arrangement, in which the shape of a reflecting face 42 of a light guiding plate 40 has a reverse V shape so that the reflecting face 42 comes closest to an emitting face side at the center of the light guiding plate 40, is known. The reflecting face 42 reflects a light which enters from linear light sources 41a and 41b.

In accordance with the above arrangement, as shown in FIG. 14, luminance in the vicinity of the center portion of the light guiding plate 40 is prevented from decreasing, thereby making it possible to maintain uniform luminance of the whole liquid crystal display panel without deteriorating efficiency of utilization of the light.

In addition, as shown in FIG. 15, an arrangement, in which a shape of an emitting face 45 of a light guiding plate 44 has a V shape so that a thickness of the light guiding plate 44 becomes smallest at the center of the light guiding plate 44, is also known, and the arrangement shows the same effect as of the above.

In addition, as an arrangement that is similar to that disclosed in Japanese Unexamined Patent Publication No. 5-45651/1993 (Tokukaihei 5-45651), as shown in FIG. 16, an arrangement, in which light scatterers 48 for scattering a light are formed on a light guiding plate 47 so that the rate of the scattered light per unit area becomes gradually larger as they become farther from linear light sources 41a and 41b, is known. Moreover, as an arrangement that is similar to that disclosed in Japanese Unexamined Patent Publication No. 5-303017/1993 (Tokukaihei 5-303017), as shown in FIG. 17, an arrangement, in which dot patterns 50 for reflecting a light are formed on a bottom face 49 of a light guiding plate 46 so that their application area becomes gradually larger as they becomes farther from linear light sources 41a or 41b, is known. Moreover, as disclosed in Japanese Unexamined Patent Publication No. 5-55103/1993 (Tokukaihei 5-55103), an arrangement, in which another dot patterns are formed only on a section where the luminance is apt to become higher or in a section where the luminance is apt to become lower, is also known, and this arrangement shows the same effect as of the above.

However, when the quantities of lights that enter sections of a light guiding plate obtained by cutting a face, which intersects at right angle a circumferential edge of a display area on a liquid crystal display panel, from a plurality of linear light sources are different from each other, the above-mentioned arrangements have a disadvantage such that luminance on a section side, in which the quantities of incident lights are smaller, decreases.

An example of the case where the quantities of lights that enter sections of a light guiding plate are different from each other is an arrangement that one of two fluorescent tubes has a smaller diameter. The following describes the reason to adopt this arrangement.

In other words, a fluorescent tube is generally used as a linear light source, but its calorific value on an electrode section, etc. is larger compared to another electronic parts. For this reason, it is necessary to prevent a rise in temperature of a device due to a heat. In other words, when one of the fluorescent tubes has a smaller diameter, the rise in temperature due to a heat of a fluorescent tube can be restrained.

In another case, in order to reduce harmful effect to an electronic circuit due to noises generated by discharge of a fluorescent tube and to provide an arrangement that shields noises in the vicinity of a fluorescent tube which is nearer the electronic circuit, the diameter of the fluorescent tube should be decreased. In another case, an arrangement of linear light sources to each section of a light guiding plate is not symmetric.

As mentioned above, as shown in FIG. 18, for example, when quantities of lights that enter from each section of a light guiding plate are represented by $P_a$ and $P_b$, and Pa>Pb is fulfilled, the luminance $L_b$ on a portion of the light guiding plate 40 where the quantities of incident lights are smaller becomes lower than the luminance $L_a$ on a portion where the quantities of incident lights are larger, so unequal brightness of a liquid crystal panel is obtained.

SUMMARY OF THE INVENTION

It is an object of the present invention to provide a back light device which is capable of avoiding a decrease in luminance of a liquid crystal display panel on a side closer to a section where a quantity of incident light is smaller becomes low even in the case where the quantities of incident lights to a light guiding body from a plurality of light sources are different from each other, for example.

In order to achieve the above object, a back light device of a liquid crystal display device according to the present invention includes two light source and a light guiding body made of a light guiding material for guiding a light emitted from the light source so that the light is emitted towards a liquid crystal display panel. The back light device is characterized in that the light guiding body includes a first section where a quantity of incident light is larger and a second section where a quantity of incident light is smaller, the first and second sections intersecting circumferential sections of a display area on the liquid crystal display panel at right angles, in that the light guiding body includes a first optical portion for guiding a light from the first section to a central portion and for emitting a light to the liquid crystal display panel and a second optical section for guiding a light from the second section to the central portion and for emitting a light to the liquid crystal display panel and in that a border between the first and second optical sections is set nearer to the second section according to a ratio of the quantities of incident lights on each section such that a difference in luminance between the first and second optical sections are eliminated.

In accordance with the above arrangement, even in the case where a quantity of incident lights on the sections of the light guiding plate that are obtained by cutting a face intersecting the circumferential end of the display area on the liquid crystal panel at right angles is different from each other, since a border between the first and second optical sections is set nearer to the second section according to a ratio of the quantities of incident lights on each section, the difference in the luminance between the first and second optical portions is eliminated. The first optical portion mainly emits the incident light from the first section towards the liquid crystal display panel. Furthermore, the second optical section mainly emits the incident light from the second section towards the liquid crystal display panel. As a result, the display area of the liquid crystal display panel can be illuminated so that the luminance of areas respectively corresponding to the first and second optical portions becomes same. As a result, display quality of a liquid crystal display device can be improved.

In addition, another arrangement of the present invention is characterized in that at least one of the light sources is provided behind the back face of the light guiding body and that the light guiding body has an extended portion for transmitting the light from the light source provided behind the back face of the light guiding body to at least one of the sections obtained by extending the light guiding body to the vicinity of the light source provided on the back side.

In accordance with the above arrangement, the light from the light source provided behind the back face of the light guiding plate is transmitted by the extended portion so as to enter at least one of the sections of the light guiding plate obtained by cutting the face, that intersects the circumferential portion of the display area of the liquid crystal display panel at right angles. As a result, the frame area of the back light device can be further reduced compared to the arrangement that the light sources are provided along the side ends of the light guiding plate, namely to the outside of the display area of the liquid crystal display panel. Furthermore, the liquid crystal display device mounted with the back light device can be miniaturized.

For fuller understanding of the nature and advantages of the invention, reference should be made to the ensuing detailed description taken in conjunction with the accompanying drawings.

DESCRIPTION OF THE EMBODIMENTS

EMBODIMENT 1

The following describes one embodiment of the present invention with reference to FIGS. 1 through 9.

Figure 2:
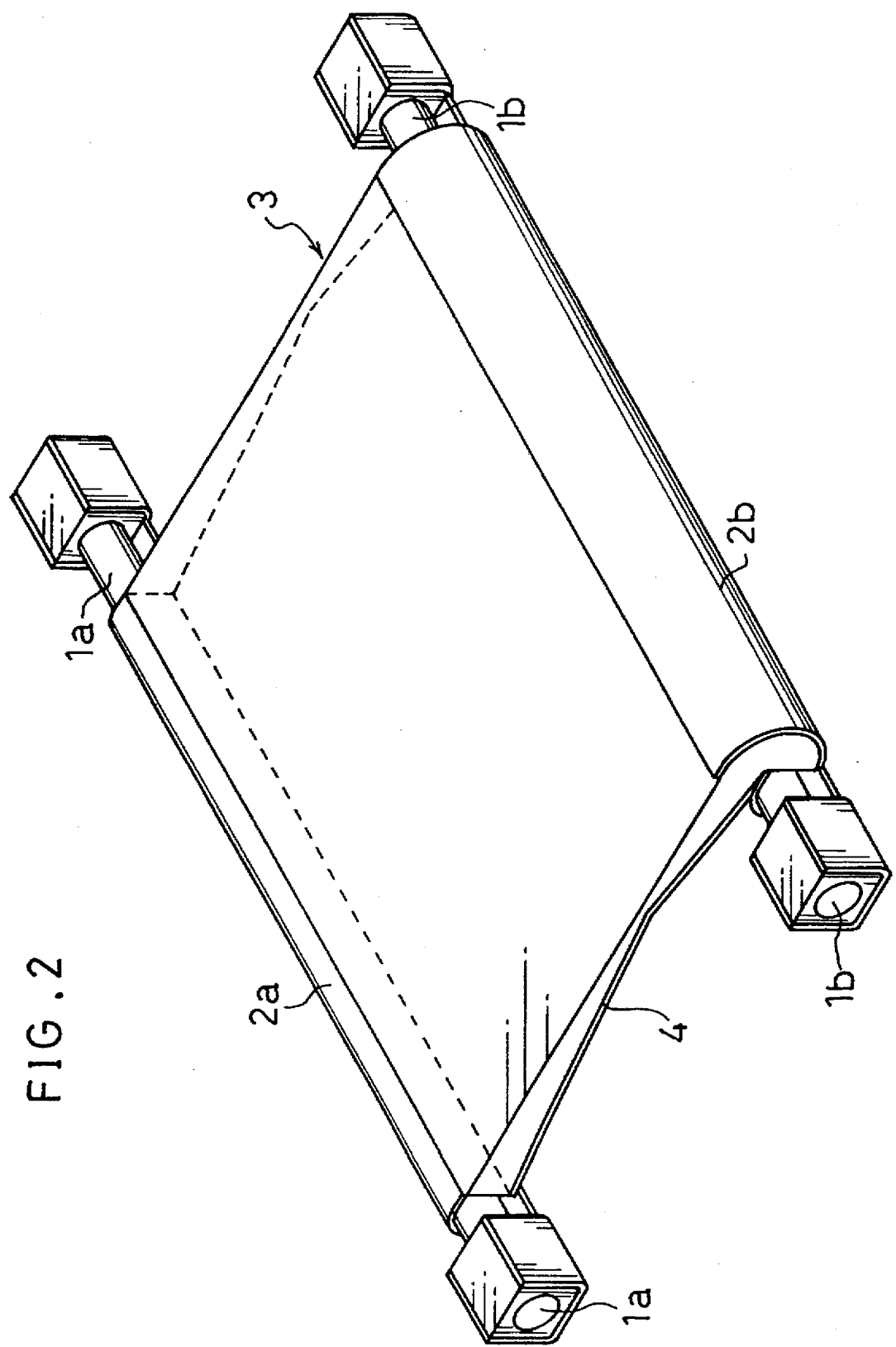
FIG. 2 is a perspective view of the back light device.

FIG. 2 is a perspective view which shows a schematic arrangement of a back light device of the present embodiment. The back light device is provided behind the back face of a liquid crystal display panel of a liquid crystal display device, and it illuminates a display area of the liquid crystal display panel. As shown in FIG. 2, the back light device includes a light guiding plate 3, linear light sources 1a and 1b (light source), such as fluorescent tubes, that irradiate a light to the light guiding plate 3. The light guiding plate 3 is made of a material having high transmissivity with respect to every range of wavelength of a visible ray, such as transparent acrylic resin.

Figure 1:
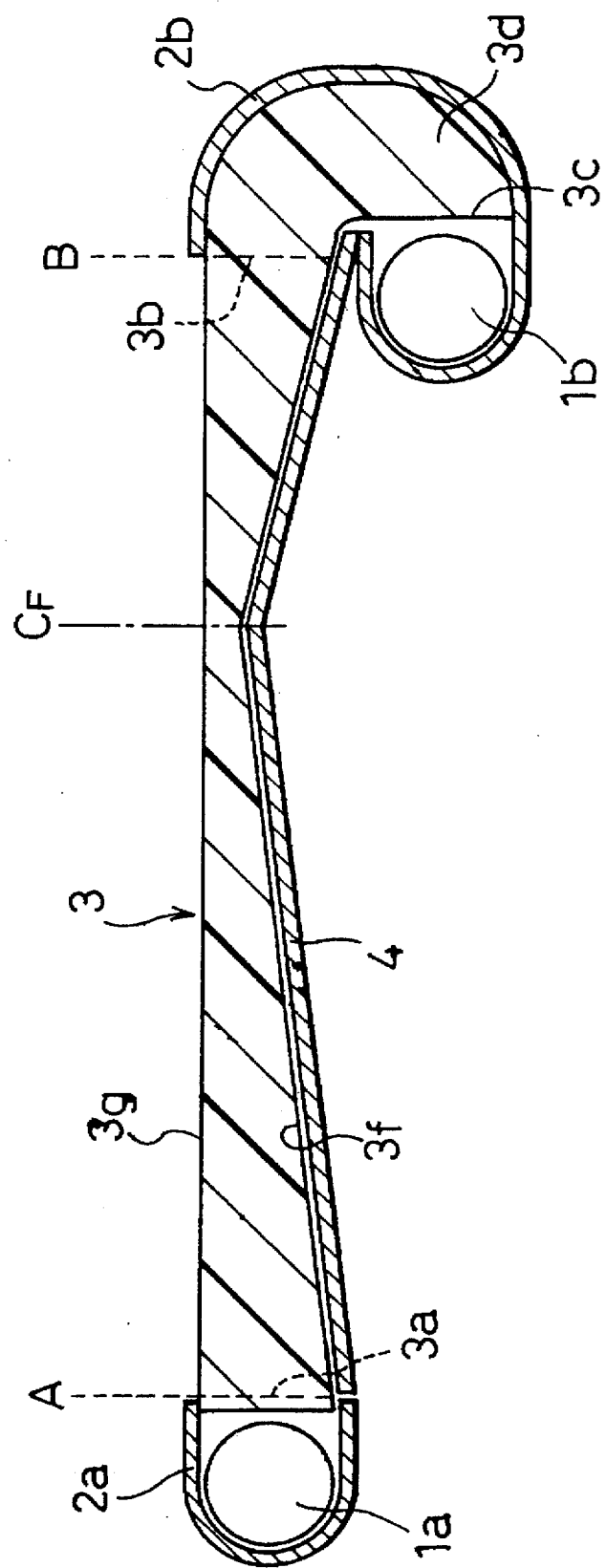
FIG. 1 is a cross sectional view which shows an arrangement of a back light device as one embodiment of the present invention.

FIG. 1 shows the shape of a cross-sectional view of the back light device in the direction which intersects perpendicularly to the linear light sources 1a and 1b. The light guiding plate 3 is formed so that a light emitting face 3g which is opposite to the liquid crystal display panel, not shown, is plane. Moreover, a reflecting face 3f which is a bottom face being opposite to the light emitting face 3g is formed so as to have almost reverse V-shaped inclination as mentioned later.

In addition, an extended portion 3d is provided to the outside of the light emitting face 3g on the linear light source 1b side of the light guiding plate 3. The extended portion 3d is arranged so that a part of the light guiding plate 3 bends substantially orthogonally to the light emitting face 3g towards the back face of the liquid crystal display panel. The linear light source 1b is placed on the reverse face of the light guiding plate 3 to the liquid crystal display panel oppositely to an end face 3c of the light guiding plate 3, and the linear light 1b irradiates a light to the end face 3c.

In addition, a reflector 2b (reflecting means) is provided so as to cover the linear light source 1b and the extended portion 3d. After the light from the linear light source 1b enters the extended portion 3d from the end face 3c, the light is reflected by the reflector 2b so as to enter the section 3b.

In FIG. 1, positions represented by broken lines "A" and "B" correspond to circumferential end sections of a display area of the liquid crystal display panel, not shown. More specifically, the display area is completely included in an effective display area that is recognized as a screen of a liquid crystal display device, and the display area completely includes a data display area that is an area, in which picture elements are arranged so that data are practically displayed.

The broken lines "A" and "B" are perpendiculars from the circumferential end section of the display area to the light guiding plate 3, and the sections 3a and 3b are of the light guiding plate 3 on the broken lines "A" and "B". In FIG. 1, for example, a reflector 2a is provided so as to be slightly superimposed on the end section of the light guiding plate 3 on the linear light source 1a side. Moreover, substantially same position as the end section of the reflector 2a corresponds to the circumferential end section of the display area of the liquid crystal display panel as shown by the broken line "A". However, practically, the back light device is arranged such that the circumferential section of the display area on the liquid crystal display panel corresponds to a position that is slightly closer to the center of the light guiding plate 3 than the end section of the reflector 2a.

The lights that entered the light guiding plate 3 from the linear light sources 1a and 1b through the sections 3a and 3b are totally reflected by the light emitting face 3g and the reflecting face 3f of the light guiding plate 3 so as to be propagated in the direction, in which a distance from each light source becomes longer, inside the light guiding plate 3, namely, towards the center of the light guiding plate 3. Moreover, the light that entered the light emitting face 3g at an angle within a prescribed range transmits through the light emitting face 3g so as to be irradiated towards the liquid crystal display panel, not shown, which is opposite to the light emitting face 3g. Furthermore, a reflecting plate 4 is for reflecting a light is laminated on the outside of the base of the light guiding plate 3. The reflecting plate 4 reflects the light that goes out of the light guiding plate 3 through the reflecting face 3f so that the light returns to the inside of the light guiding plate 3, thereby improving utilization of a light.

In accordance with this arrangement, since a quantity of lights that enter the sections of the light guiding plate 3 obtained by cutting faces intersecting the circumferential ends of the display area on the liquid crystal display panel, namely, the sections 3a and 3b are not same because the linear light sources 1a and 1b are not symmetrically mounted to the light guiding plate 3. In other words, a quantity of light which enters the section 3b (second section) from the linear light source 1b is smaller than the light which enters the section 3a (first section) from the linear light source 1a. This is because even if fluorescent tubes that have same optical properties are used as the linear light sources 1a and 1b and electric power, etc. that drives these fluorescent tubes have same conditions, the light from the linear light source 1b is attenuated until it enters the section 3b by the reflection of the light by the reflector 2b, etc.

A position obtained by dividing a distance between the sections 3a and 3b, i.e. between "A" and "B" according to ratio of the quantity of the incident light on the section 3a to that on the section 3b is a border "$C_F$" represented by alternate long and short dash lines in FIG. 1. In accordance with the arrangement shown in FIG. 1, the reflecting face 3f of the light guiding plate 3 is formed so as to have inclinations such that a thickness of the light guiding plate 3 becomes gradually smaller as it is closer from the section 3a on the linear light source 1a side to the border "$C_F$" and becomes gradually larger as it is closer from the border "$C_F$" to the section 3b.

In such a manner, when the position of the border "$C_F$" is set according to the ratio of the quantity of the incident light on each section and the reflecting face 3f is formed according to the position of the border "$C_F$", luminance of an area on the linear light source 1a side of the border "$C_F$" (first optical portion) can be substantially equalize with that of an area on the linear light source 1b side of the border "$C_F$" (second optical portion) on the light emitting face 3g. The light from the linear light source 1a is mainly emitted from the area on the linear light source 1a side of the border "$C_F$" (first optical portion). Moreover, the light from the linear light source 1b is mainly emitted from the area of the linear light source 1b side of the border "$C_F$" (second optical portion).

Figure 3:
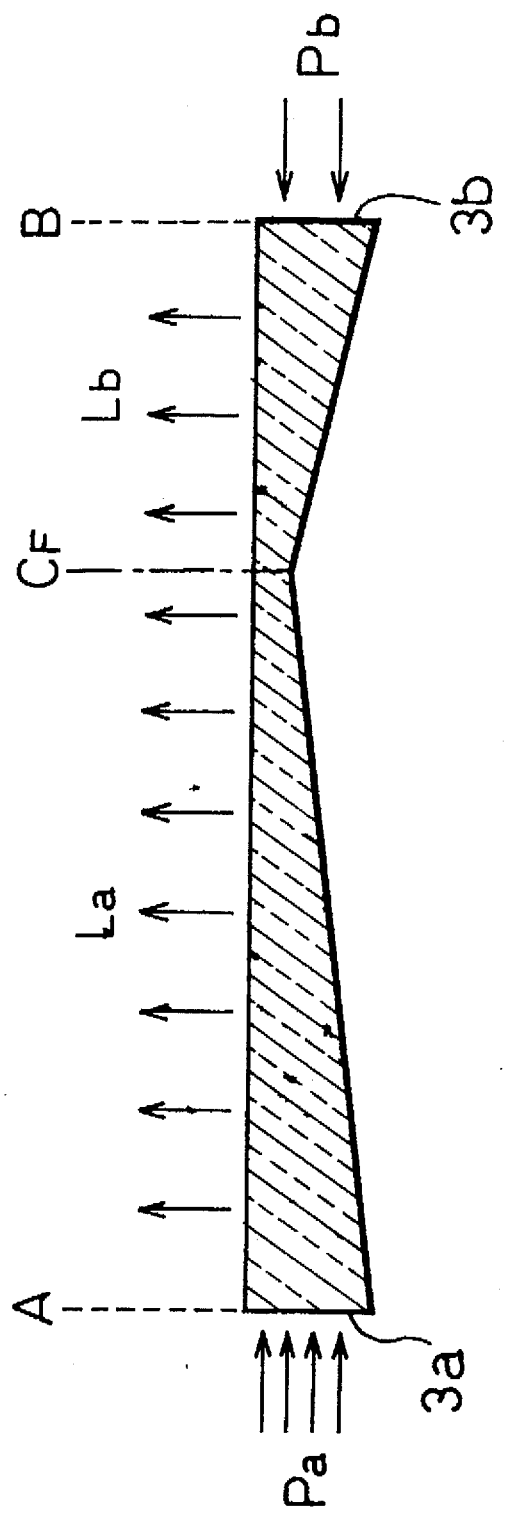
FIG. 3 is an explanatory drawing which shows a relationship between the quantity of incident lights and luminance of the light emitting face on a light guiding plate of the back light device.

In other words, as shown in FIG. 3, when the quantity of the incident light on the section 3a is represented by Pa and the quantity of the incident light on the section 3b is represented by Pb, it is assumed that the Pa:Pb=2:1 is fulfilled. In this case, as shown in FIG. 3, when the border "$C_F$" is set to a position which divides the distance between "A" and "B" in about the ratio 2:1, the luminance La on the side which is closer to the linear light source 1a becomes substantially equal to the luminance Lb which is closer to the linear light source 1b.

In FIG. 1, the reflecting face 3f is preferably formed by rectilinear faces with constant inclination angle respectively, but it is not necessarily limited to this configuration, as long as the reflecting face 3f is be formed so that the luminance of the light emitting face 3g is uniform. For example, the surface of the reflecting face 3f could be uneven, or the inclination angle could be partially altered.

Figure 9:
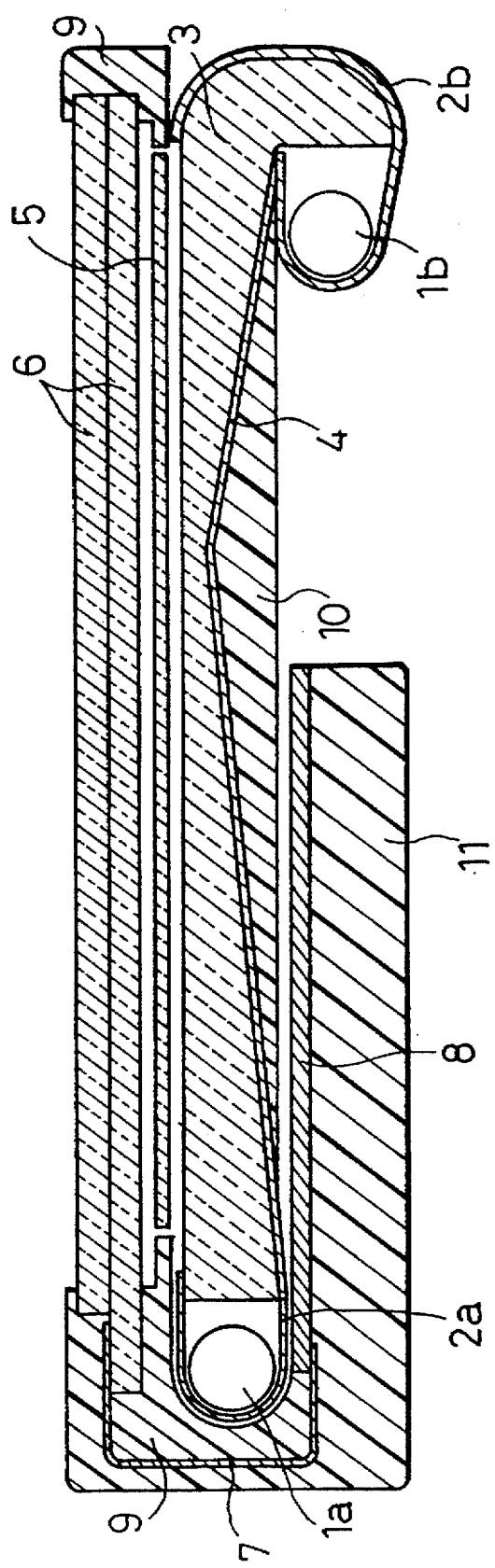
FIG. 9 is a cross sectional view which shows a schematic arrangement of a liquid crystal display device having the back light device.

The following describes one example of a schematic arrangement of the liquid crystal display device adopting the above-mentioned back light device in reference to FIG. 9. As shown in FIG. 9, the back light device is positioned behind the back face of a liquid crystal display panel 6 of the liquid crystal display device through a frame 9. A diffusion sheet 5 is laminated between the liquid crystal display panel 6 and the back light device. The diffusion sheet 5 uniformly diffuses a light emitted from the back light device on the whole face of the liquid crystal display panel 6. Moreover, a reflecting plate holder 10 is provided in order to fix the reflecting plate 4 laminated on the rear side of the base of a light guiding plate 3.

In addition, a case 11, which is formed so as to cover one side of the liquid crystal panel 6 and of the back light device, is provided. In the case 11, a substrate 8 for driving the liquid crystal panel 6 is provided onto the down face of the back light device. The substrate 8 is electrically connected to the liquid crystal panel 6 via a TAB (Tape Automated Bonding) 7.

In this back light device, since a linear light source 1b is provided to the back side of the light guiding plate 3 an area of a frame of the back light device can be small. As a result, the area of the frame of the liquid crystal display device can be miniaturized. Moreover, as is clear from FIG. 9, since a thickness of the linear light source 1b side is within the range of the thickness of the case 11, the thickness of the liquid crystal display device does not become larger.

Figure 4:
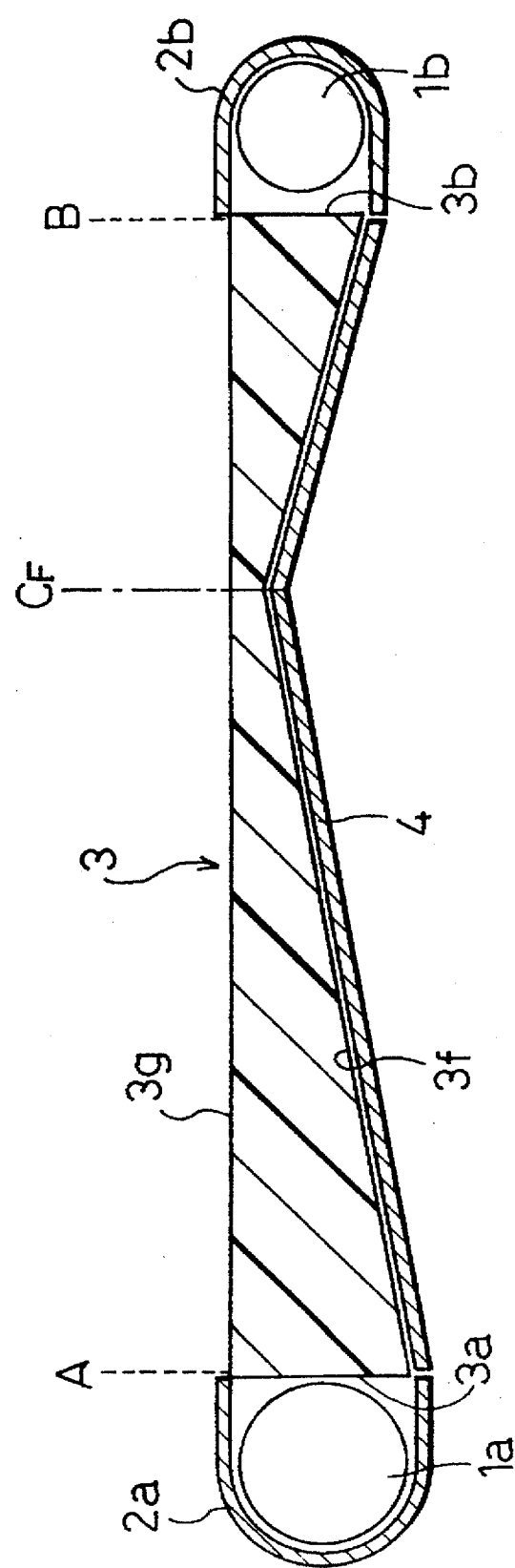
FIG. 4 is a cross sectional view which shows an example of another arrangement of the back light device.

In addition, as shown in FIG. 4, the bottom face of the light guiding plate 3, i.e. the shape of the reflecting face 3f is applicable to an arrangement that the linear light source 1a and the linear light source 1b with a smaller diameter than that of the linear light source 1a are provided on both ends of the light guiding plate 3. In accordance with the above arrangement, since a quantity of a calorific value of the linear light source 1b is smaller than that of the linear light source 1a, a calorific value of the back light device is controlled. Furthermore, similarly to the aforementioned arrangement, a difference in the luminance of the display area on the liquid crystal display panel between the closer side to the linear light source 1a and the closer side to the linear light source 1b can be prevented.

Figure 5:
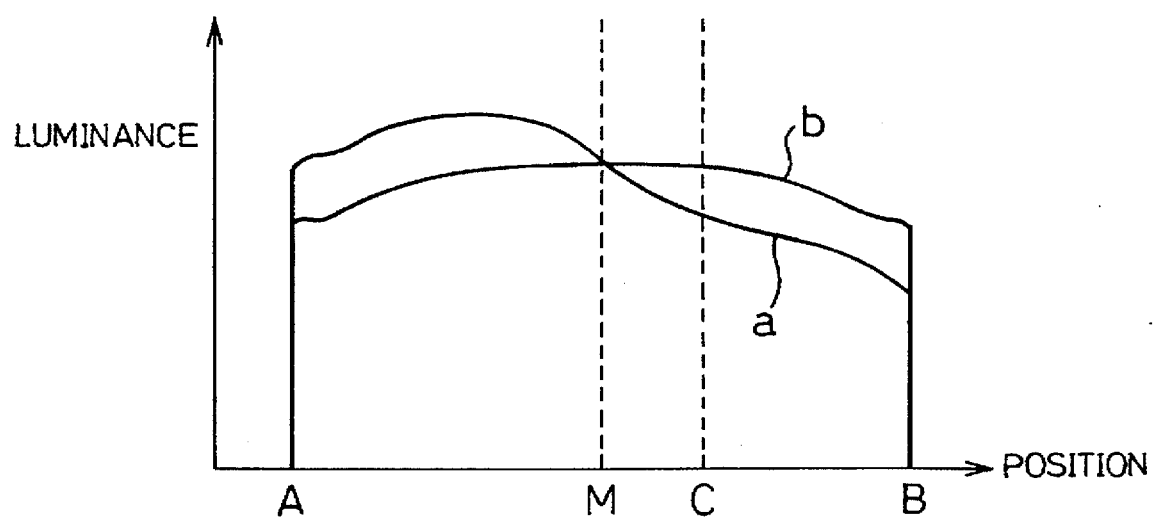
FIG. 5 is a graph which shows a change in distribution of luminance with boundary positions of a first optical section and a second optical section on the light guiding plate of the back light device.

FIG. 5 is a graph which shows the distribution of the luminance of the area between "A" and "B" of the light guiding plate 3 with respect to the following two cases. A curved line "a" in FIG. 5 shows the case (1) where the quantities of incident lights on the section 3a and the section 3b from the two linear light sources respectively are different from each other (Pa:Pb =2:1) and the border "$C_F$" is set on a position "M" that is the substantially middle position between the two linear light sources in like manner of conventional one. As is clear from FIG. 5, the luminance of the light guiding plate 3 becomes higher on the side that is closer to the section 3a than the position "M", and it becomes lower on the side that is closer to the section 3b than the position "M".

Meanwhile, a curved line "b" shows distribution of the luminance in the case where (2) the quantity of incident lights on the sections 3a and 3b from the linear light sources are different (same condition as (1)) and the border "$C_F$" is set on the position "C" that divides the distance between "A" and "B" in about the ratio 2:1 according to the ratio of the quantity of incident lights on the light guiding plate from each linear light source. As is clear from FIG. 5, the distribution of the luminance is substantially symmetric in the both areas whose border is "$C_F$".

Figure 6:
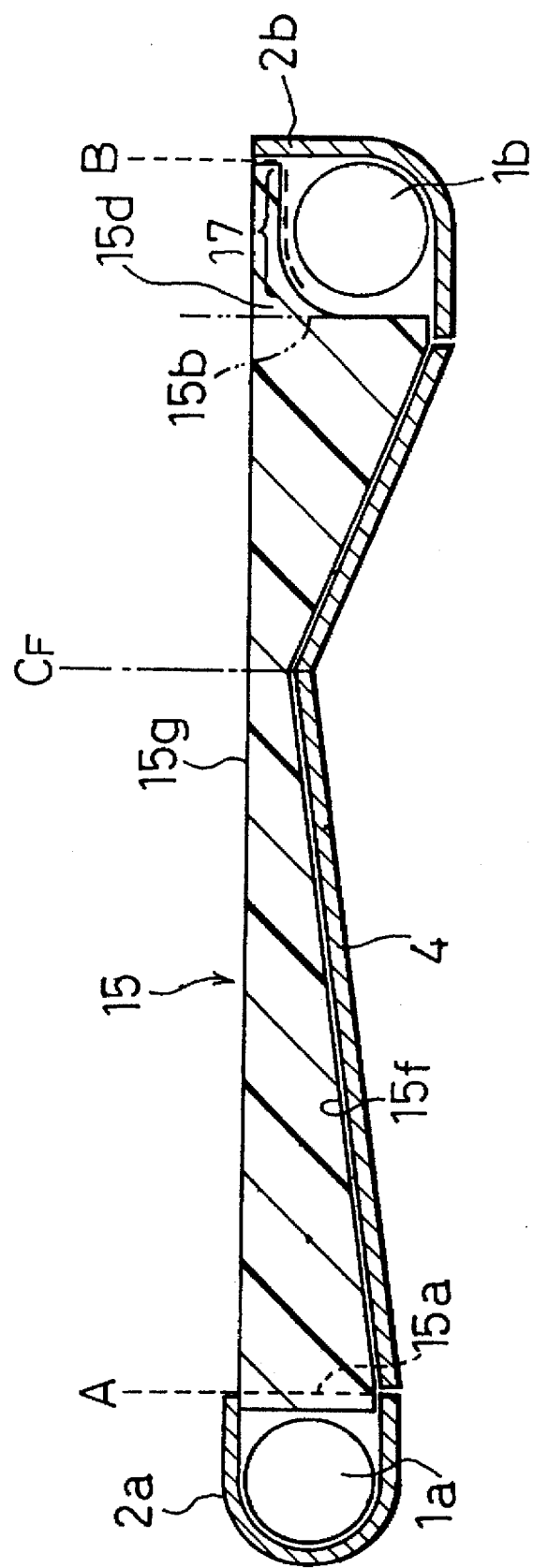
FIG. 6 is a cross sectional view which shows an example of another arrangement of the back light device.

In addition, as shown in FIG. 6, a reflecting portion 15f having the same shape as that of the reflecting face 3f is also applicable to the arrangement that an extended portion 15d is formed above one of linear light sources (in FIG. 6, the linear light source 1b) by extending a portion of a light guiding plate 15 and thus the linear light source 1b is laid below the light guiding body at portion 15d in the right end portion of "A-B" corresponding to the display area on the liquid crystal display panel. A light emitting face 15g opposite the reflecting portion 15f. The following describes this arrangement in reference to FIG. 6.

In accordance with the above arrangement, the outside of the linear light source 1b is covered by the reflector 2b for reflecting a light, and a light shielding pattern 17 is formed by a white print method or a metal deposition method on the counter face of the extended portion 15d of the light guiding plate 15 to the linear light source 1b in order to reduce luminance of a light that is transmitted substantially parallel with a normal line of the light guiding plate 15 from the linear light source 1b. The light shielding pattern 17 prevents the face luminance in the vicinity of the linear light source 1b from becoming extremely higher than the other portions.

In addition, an inclination is given to the reflecting face 15f that is the bottom face of the light guiding plate 15 such that the transmitting plate 15 becomes gradually thicker in the respective directions towards sections 15a and 15b from the border "$C_F$" shown by alternate long and short dash lines in FIG. 6. The position of the border "$C_F$" may be set approximately according to the ratio of the quantities of incident lights on the section 15a and the section 15b which is the opposite side to the linear light source 1b.

In accordance with this arrangement, when the linear light source 1b is positioned on the back side of the area between "A" and "B" corresponding to the display area of the liquid crystal display panel, the area of a frame of the back light device can be made smaller than in the arrangement that the linear light sources are provided to the outside of the both ends of the light guiding plate. For this reason, the back light device can be miniaturized, and in the same way as of the aforementioned arrangement, lowering of the luminance on the linear light source 1b side can be prevented.

As mentioned above, the back light device of the present invention in the liquid crystal display device is arranged such that the border "$C_F$" is brought close to the section 3b or the section 15b on which the quantity of the incident light is relatively small according to the ratio of the quantities of the incident lights on the sections 3a and 3b or on the sections 15a and 15b of the light guiding plate 3 that is divided on the surface intersecting the circumferential ends of the display area on the liquid crystal display panel.

As a result, when the lights from the linear light sources 1a and 1b are emitted towards the liquid crystal display panel, the difference in the luminance on the both sides of the border "$C_F$" is not produced. As a result, on the liquid crystal display panel, the area that is closer to the section on which the quantity of incident lights is relatively small does not become dark, thereby making it possible to improve the quality of display.

Figure 7:
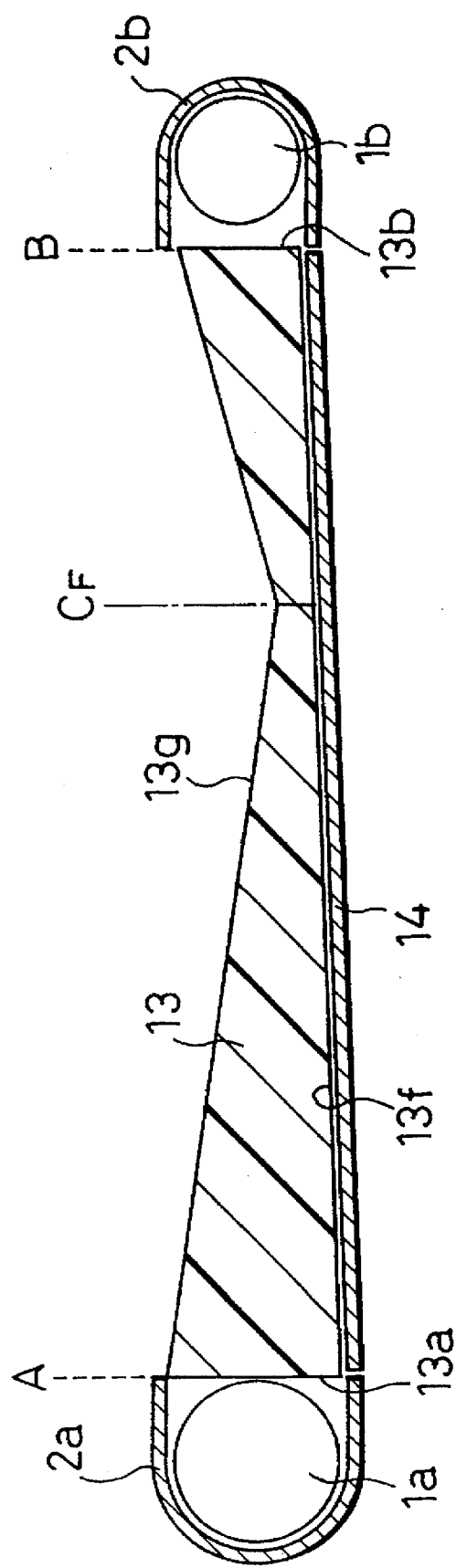
FIG. 7 is a cross sectional view which shows an example of another arrangement of the back light device.

In addition, as shown in FIG. 7, another example of the above-mentioned arrangements may be an arrangement in which the V-shaped light emitting face 13g is formed so that the thickness of the light guiding plate 13 becomes smallest on the border "$C_F$" that is close to the section 13b side and in which the reflecting face 13f is flat. The position of the border "$C_F$" can be determined according to the ratio of a quantity of incident light on the section 13a from the linear light source 1a to a quantity of incident light on the section 13b from the linear light source 1b having smaller diameter than the linear light source 1a. In other words, if the ratio of the light amount on the section 13a to the light amount on the section 13b is 2:1, the border "$C_F$" may be set in the position that divide the distance between the sections 13a and 13b in the ratio 2:1. This arrangement makes it possible to obtain the same effect as the arrangement of FIG. 4. A reflecting plate 14 is opposite the reflecting portion 15f.

Figure 8:
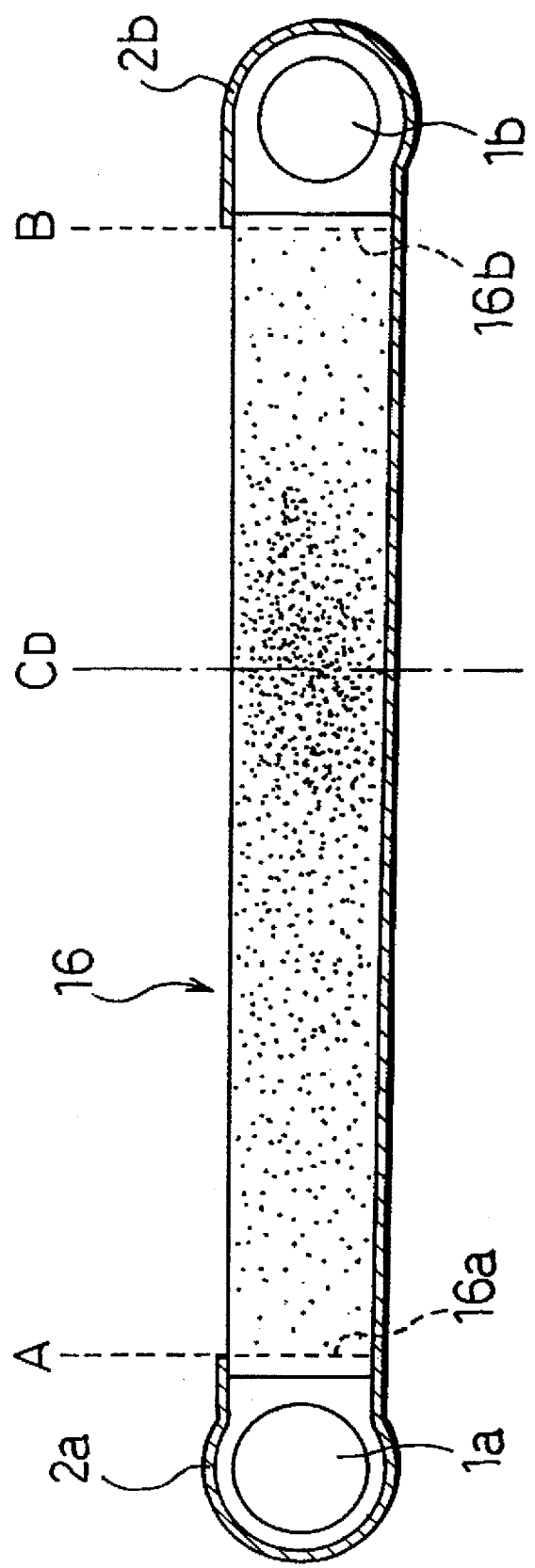
FIG. 8 is a cross sectional view which shows an example of another arrangement of the back light device.

In addition, as shown in FIG. 8, in accordance with the arrangement having a light guiding plate 16, which is formed so as to have an uniform thickness over an area between "A" and "B" corresponding to the display area on the liquid crystal panel, and the linear light sources 1a and 1b having different diameters, luminance of an light emitting face can be made uniform by adjusting density of grains for scattering a light in the light guiding plate 16. Namely, a position, which is obtained by dividing a distance between sections 16a and 16b according to a ratio of a quantity of an incident light on the section 16a from the linear light source 1a to a quantity of an incident light on the section 16b from the linear light source 1b having a smaller diameter than of the linear light source 1a, is a border "$C_D$", and the grains for scattering a light are positioned so that the density becomes highest in the vicinity of the border "CD". As a result, lights are effectively scattered on the nearer side to the section 16b on which a quantity of incident light is smaller, and thus lowering of luminance on the closer side to the section 16b can be prevented in the same manner as of the aforementioned arrangements.

EMBODIMENT 2

Figure 10:
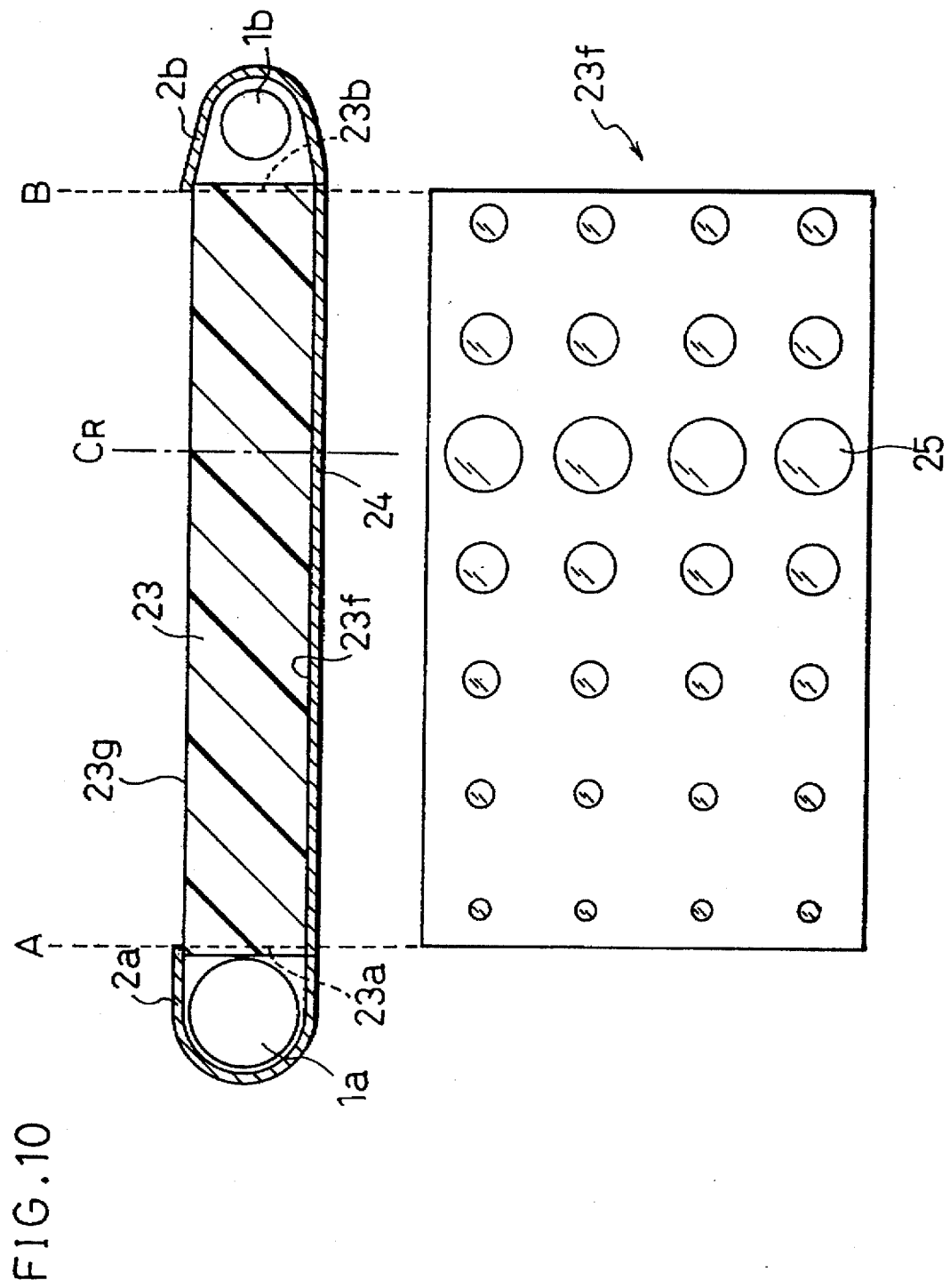
FIG. 10 is a drawing which shows an arrangement of a back light device of a liquid crystal display device in another embodiment of the present invention: the upper section is a cross sectional view; and the lower section is a plan view.
Figure 11:
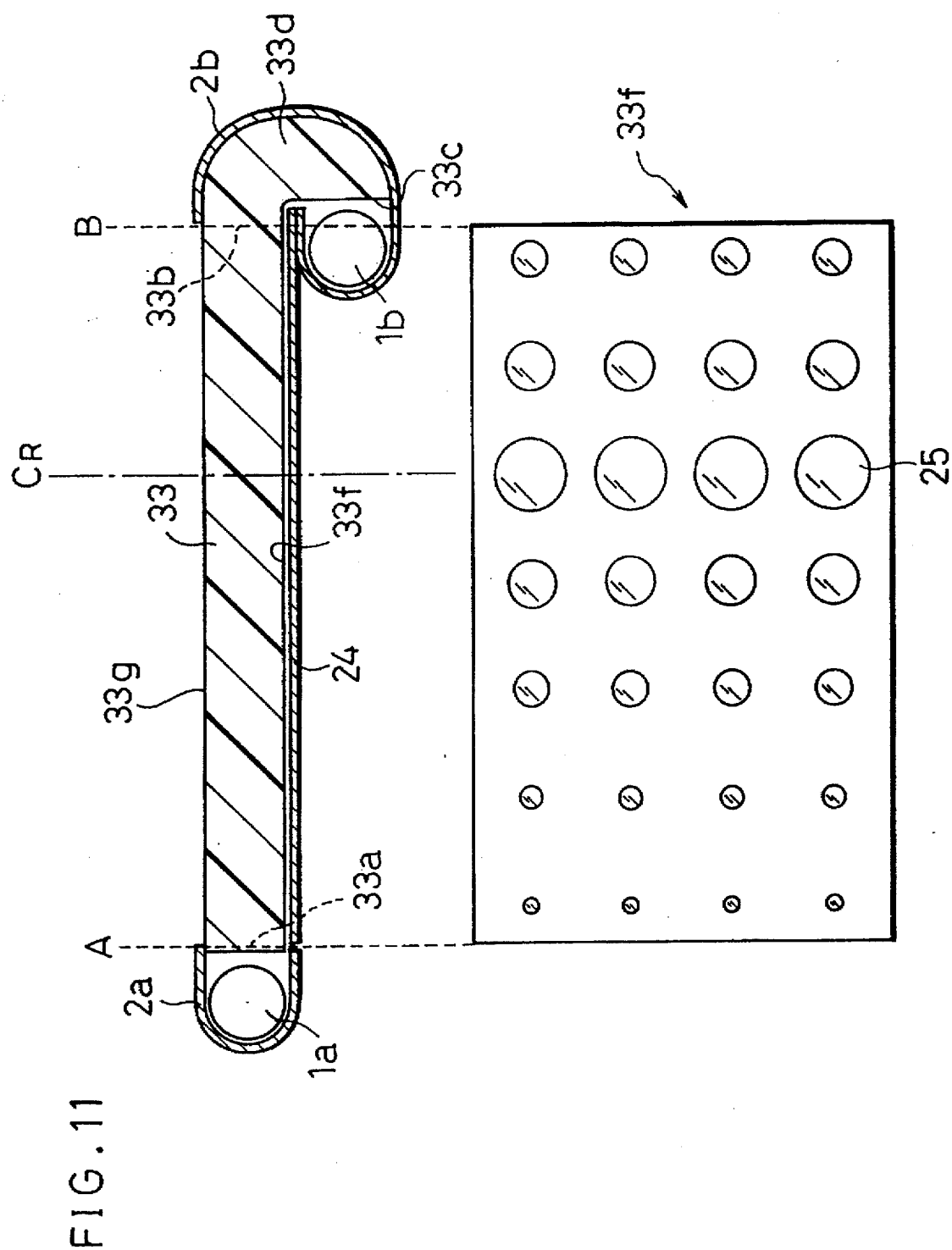
FIG. 11 is a drawing which shows an example of another arrangement of the back light device: the upper section is a cross sectional view; and the lower section is a plan view.
Figure 12:
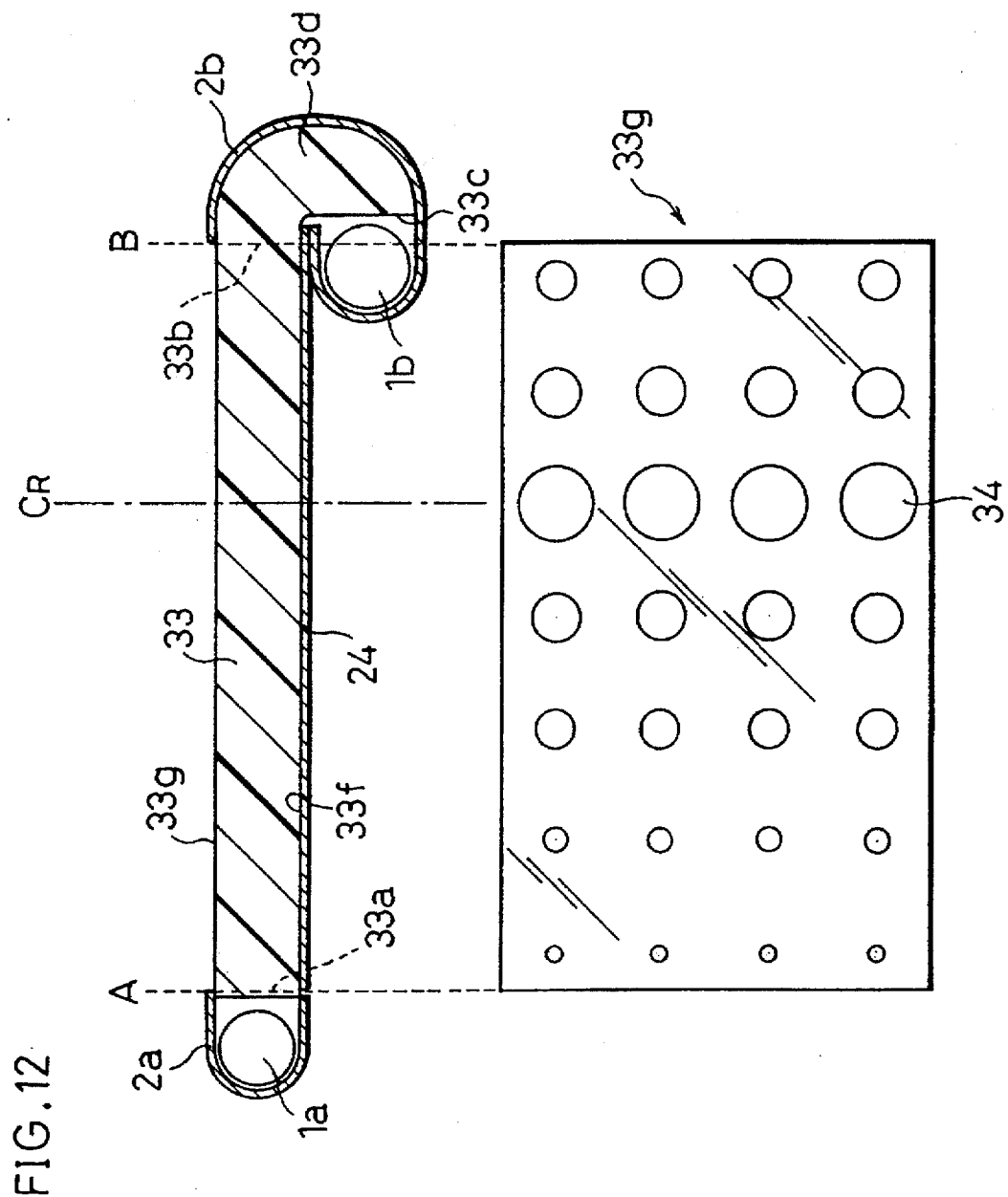
FIG. 12 is a drawing which shows an example of another arrangement of the back light device: the upper section is a cross sectional view; and the lower section is a plan view.
Figure 13:
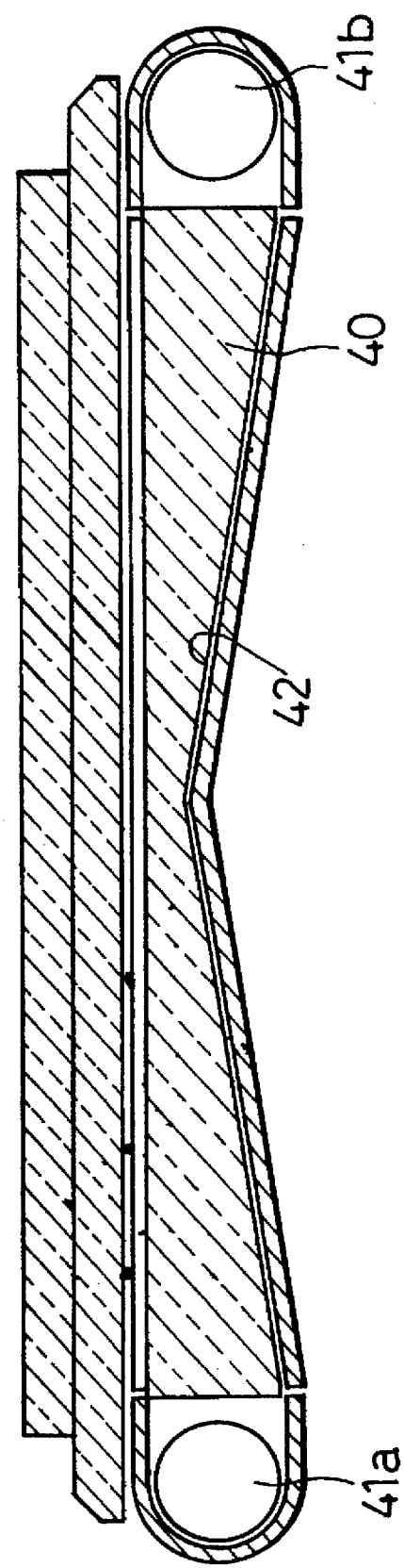
FIG. 13 is a cross sectional view which shows one example of a back light device of a conventional liquid crystal display device.
Figure 14:
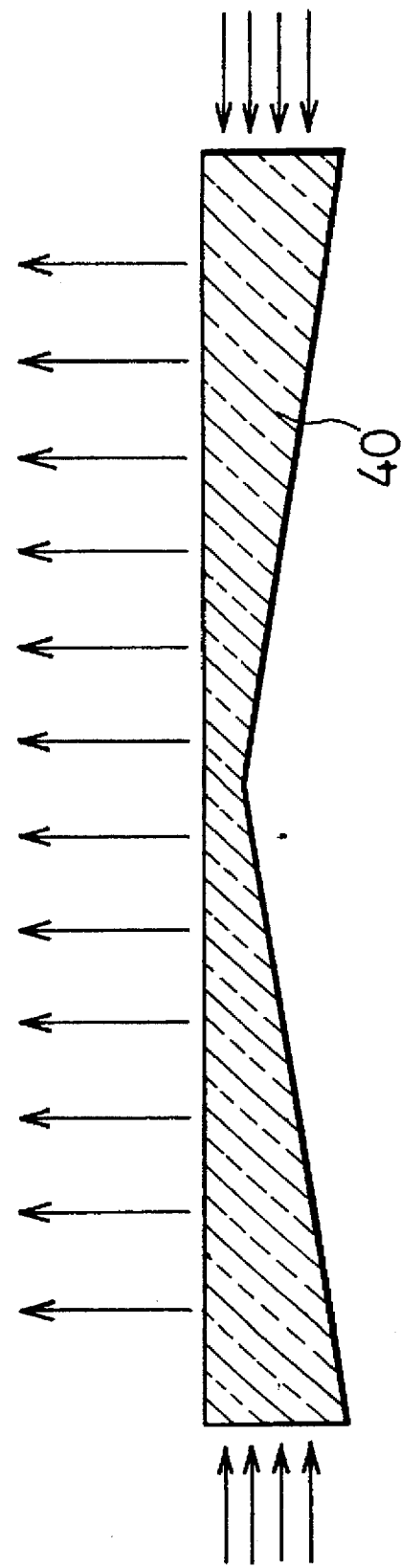
FIG. 14 is a constitutional drawing which shows a relationship between the quantities of incident lights and luminance on a light guiding plate of the back light device.
Figure 15:
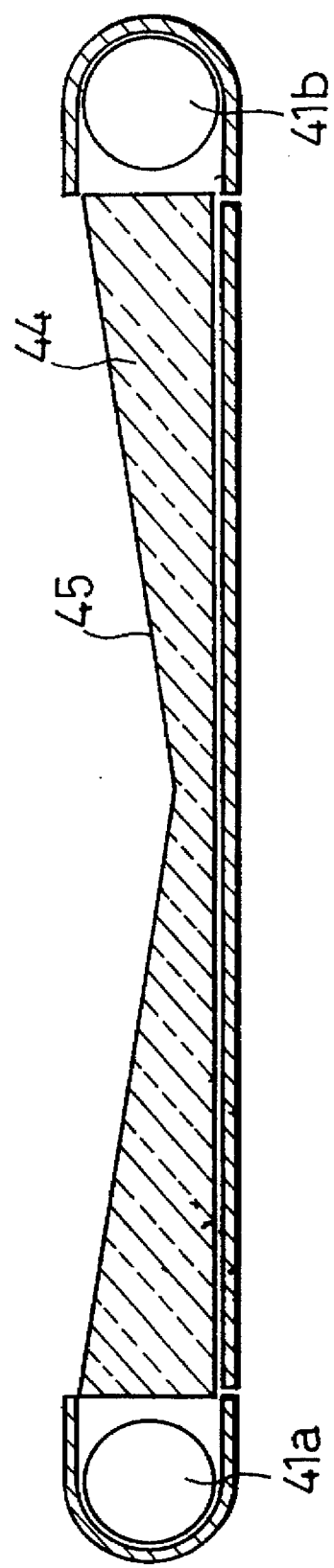
FIG. 15 is a cross sectional view which shows an example of another arrangement of a back light device of a conventional liquid crystal display device.
Figure 16:
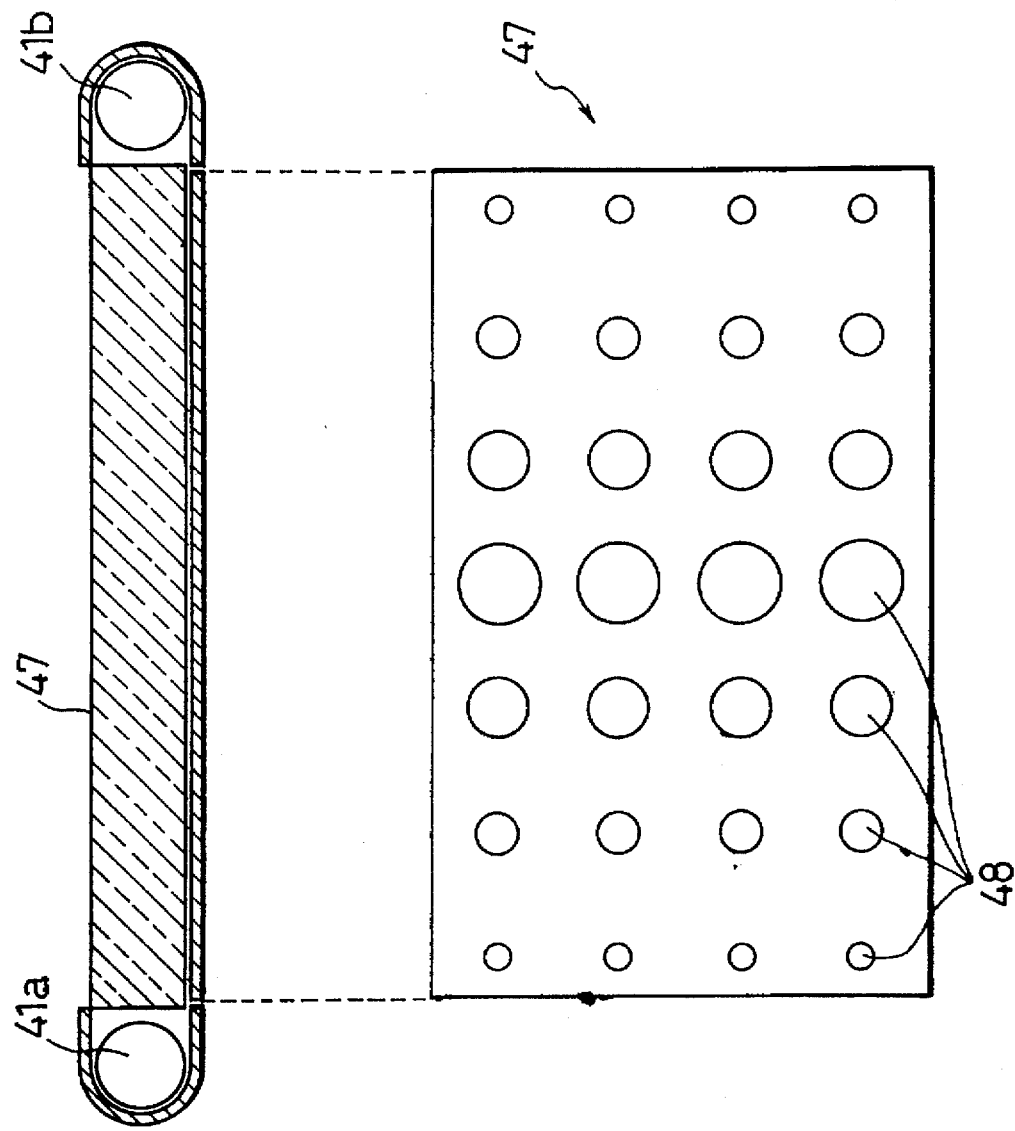
FIG. 16 is a drawing which shows an example of another arrangement of a back light device of a conventional liquid crystal display device: the upper section is a cross sectional view; and the lower section is a plan view.
Figure 17:
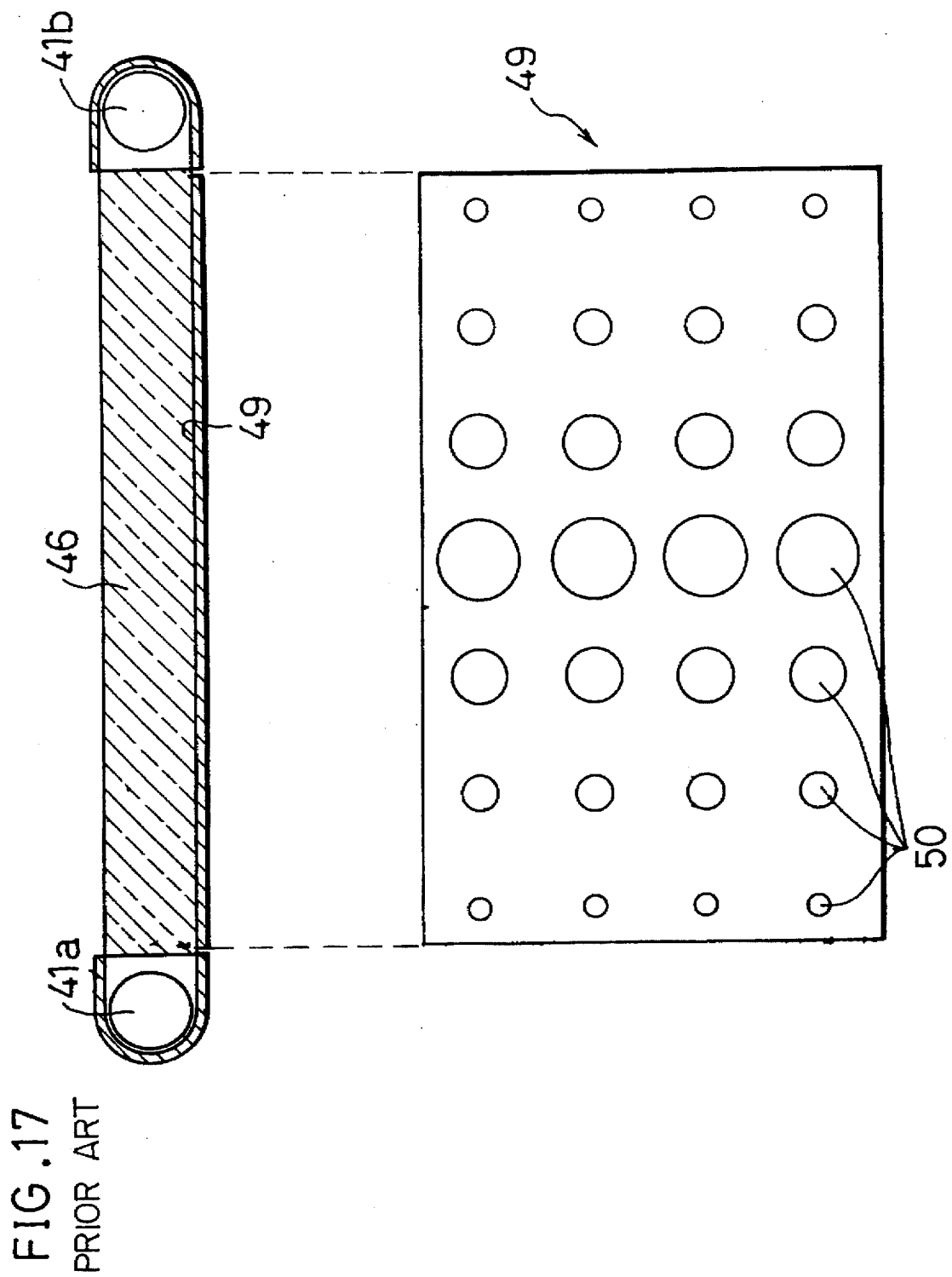
FIG. 17 is a drawing which shows an example of another arrangement of a back light device of a conventional liquid crystal display device: the upper section is a cross section; and the lower section is a plan view.
Figure 18:
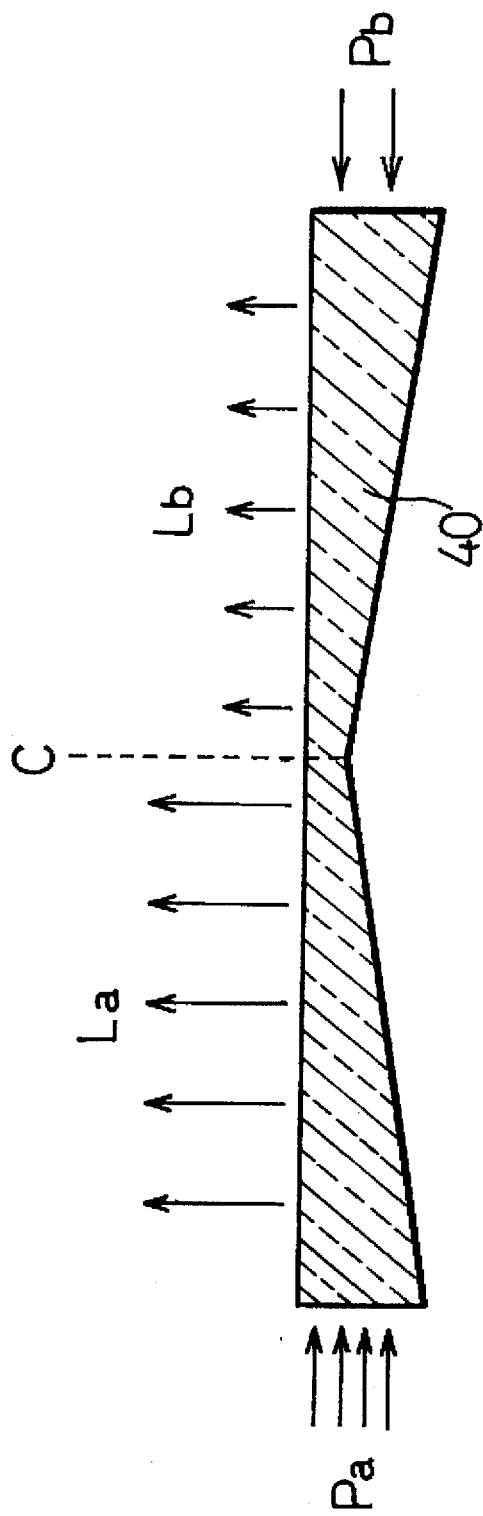
FIG. 18 is a constitutional drawing which shows a relationship between the quantities of incident lights and luminance on a light guiding plate of a conventional back light device.

The following describes another embodiment of the present invention in reference to FIGS. 10 through 12. Here, for convenience of explanation, those members that have the same arrangement and functions, and that are described in the aforementioned embodiment are indicated by the same reference numerals and the description thereof is omitted.

First, the description is given as to an arrangement that two linear light sources 1a and 1b having different diameters shown in FIG. 10 are provided along both ends of a light guiding plate 23. Here, the linear light source 1b has a smaller diameter than of the linear light source 1a, and the luminance intensity emitted from the linear light source 1b and its power consumption are smaller than of the linear light source 1a.

In accordance with this arrangement, lights from the linear light sources 1a and 1b enter the light guiding plate 23 from the both ends 23a and 23b of the light guiding plate 23. The incident lights are totally reflected by a light emitting face 23g and a reflecting face 23f of the light guiding plate 23, and while advancing towards the center portion of the light guiding plate 23, the lights, which entered the light emitting face 23g at an angle in a prescribed range are emitted from the light emitting face 23g so as to be irradiated to a liquid crystal display panel, not shown, that is opposite to the light emitting face 23g.

In FIG. 10, the sections 23a and 23b correspond to sections obtained by cutting faces of the light guiding plate 23 that intersect circumferential portions of a display area (area between "A" and "B") on the liquid crystal display panel. Moreover, FIG. 10 also shows a plan view of the reflecting face 23f that is viewed from the light emitting face 23g.

As shown in the plan view of FIG. 10, white dots 25 for scattering and reflecting a light are formed on the reflecting face 23f of the light guiding plate 23. The dots 25 can be formed by applying coating obtained by powder, such as titanium oxide, with a solvent, such as adhesive, to the reflecting face 23f and by drying the coating, or in like manners.

Lights, which entered the reflecting face 23f and the dots 25, are scattered and reflected so as to pass the light emitting face 23g. Then the light are emitted towards the liquid crystal panel, not shown. Meanwhile, lights which entered an area other than the dots 25 on the reflecting face 23f are totally reflected. Moreover, a reflecting plate 24 is laminated on the back side of the reflecting face 23f, and it sends back the lights transmitted through the reflecting face 23f into the light guiding plate 23, thereby improving a utilization factor of a light.

As shown in FIG. 10, the dots formed such that their areas gradually become smaller as they become closer to each linear light source from a border "$C_R$" shown by alternate long and short dash lines in FIG. 10. When a quantity of incident light on the section 23a from the linear light source 1a is represented by Pa and a quantity of incident light on the section 23b from the linear light source 1b is represented by Pb, the border "$C_R$" is set in a position that divides a distance between the sections 23a and 23b (A-B) in about the ratio Pa:Pb.

In such a manner, when the border "$C_R$" is set according to a ratio of a quantity of incident lights on each section such that its position comes closer to the section 23b side on which a quantity of incident light is relatively small, a difference in the luminance between an area between the border "$C_R$" and the section 23a (first optical portion) and an area between the border "$C_R$" and the section 23b (second optical portion) can be eliminated. The former area mainly allows the light from the linear light source 1a to be emitted to the liquid crystal display panel, and the latter area mainly allows the light from the linear light source 1b to be emitted to the liquid crystal display panel.

As a result, even if the quantities of incident lights from the linear light sources 1a and 1b are different, it can be prevented that the side which is nearer to the linear light source 1b becomes dark on the liquid crystal display panel. Moreover, since the linear light source 1b has a smaller diameter than of the linear light source 1a and its calorific value is smaller, a calorific value of the back light device can be controlled.

In addition, as shown in FIG. 11, in accordance with an arrangement that an extended portion 33d, which is bent to a substantially right angle towards the back side of the liquid crystal display panel, is provided to one of the outsides of the light emitting face 33g corresponding to a display area (area between "A" and "B") in a light guiding plate 33, a linear light source 1a is provided so as to be opposite to one of the end faces of the light guiding plate 33 and that a linear light source 1b is provided so as to be opposite to an end face 33c of the extended portion 33d, dots 25 mentioned in the above can be also formed on the reflecting face 33f of the light guiding plate 33, thereby obtaining the same effect as of the above arrangement.

In this case, a border "$C_R$" between a first optical portion which mainly allows the light from the linear light source 1a to be emitted to the liquid crystal display panel and a second optical portion which mainly allows the light from the linear light source 1b to be emitted to the liquid crystal display panel can be positioned according to a ratio of a quantity of incident light on the section 33a to a quantity of incident light on the section 33b. The sections 33a and 33b are obtained by cutting a face of the light guiding plate 33 which intersects a circumferential end of a display area on the liquid crystal display panel at right angles. The border "$C_R$" may be set on a position that substantially divides a distance between A and B in a ratio of a quantity of incident light on the section 33a to a quantity of incident light on the section 33b. Moreover, the areas of the dots 25 may change gradually according to a distance from each section. In other words, when the dots 25 are formed such that the area of the dots 25 becomes largest on the border "$C_R$", and the area becomes gradually smaller as they comes closer to each section, the luminance of the light emitting face can become uniform.

In addition, as shown in FIG. 12, the light emitting face 33g (area between "A" and "B") of the light guiding plate 33 is arranged so that transmitting holes 34 for transmitting a light are provided and that white print, a light shielding pattern or the like for reflecting a light is provided on a portion of the light emitting face 33g other than that where the transmitting holes 34 are formed. In accordance with this arrangement, in the same manner as that of the aforementioned arrangement, the border "$C_R$" is set on a position, that substantially divides the distance between "A" and "B", according to the ratio of a quantity of incident light on the section 33a and a quantity of incident light on the section 33b, the transmitting holes 34 may be arranged such that the area of the transmitting holes 34 gradually changes according to the distance between the border "$C_R$" and each section.

The present invention is not necessarily limited to the arrangements described in each embodiment, so an arrangement of the present invention can be variously changed. For example, the arrangement that the circular dots 25 or circular transmitting holes 34 are formed on the light guiding plate were described in reference to FIGS. 10 through 12, but the shape of the dots or the transmitting holes is not necessarily limited only to a circle. Moreover, various materials can be applied to coating used for printing the dots 25 as long as it scatters and reflects a light. Further, instead of the dots, uneven portions with a spherical shape or with a cone shape can be provided on the reflecting face of the light guiding plate so that intervals between the uneven portions are changed according to the distance from each section. Furthermore, grooves with V-shaped sectional shape, for example, can be formed on the reflecting face such that intervals between the grooves are altered according to the distance from each section.

In addition, optical properties and the mounting system of the two linear light sources are not also limited to the examples mentioned in each embodiment.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A back light device of a liquid crystal display device, comprising:

light sources; and a light guiding body made of a light transmitting material for transmitting light emitted from said light sources so that the light is emitted towards a liquid crystal display panel, wherein said light guiding body includes a first section where a quantity of incident light is larger and a second section where a quantity of incident light is smaller, wherein said light guiding body includes a first optical portion for guiding a light from said first section to a central portion of said light guiding body and for emitting a light to the liquid crystal display panel and a second optical section for transmitting a light from the second section to the central portion of said light guiding body and for emitting a light to the liquid crystal display panel, wherein a border between said first and second optical sections is set nearer to the second section according to a ratio of the quantities of incident light on each section such that a difference in luminance between the first and second optical sections are eliminated.

2. The back light device of liquid crystal display device as defined in claim 1, further comprising reflecting means for reflecting light from said light sources so as to collect the light on each section.

3. The back light device of a liquid crystal display device as defined in claim 1, wherein:

at least one of said light sources is provided behind the back face of said light guiding body, said light guiding body includes an extended portion for guiding the lights from said at least one of the linear light sources to at least one of the sections, said extended portion is extended to the vicinity of said at least one of the light sources provided behind the back face.

4. The back light device of a liquid crystal display device as defined in claim 3, further comprising reflecting means for covering the back side of the light source of the light guiding body and an outside of the extended portion of the light guiding body.

5. The back light device of a liquid crystal display device as defined in claim 1, wherein said light guiding body is formed such that its thickness becomes smallest on the border between the first and second optical portions.

6. The back light device of a liquid crystal display device as defined in claim 1, wherein said light guiding body includes a reflecting face and a light emitting face, said reflecting face having a plane surface, said light emitting face having an inclination so as to come closest to the reflecting face on the border between the first and second optical portions.

7. The back light device of a liquid crystal display device as defined in claim 1, wherein said light guiding body includes a light emitting face and a reflecting face, said light emitting face having a plane surface, said reflecting face having an inclination so as to come closest to said light emitting face on the border between the first and second optical portions.

8. The back light device of a liquid crystal display device as defined in claim 1, wherein:

said light guiding body includes a reflecting face having scattering/reflecting portions for scattering and reflecting a light, said scattering/reflecting portions are formed such that their area becomes largest in the vicinity of the border between the first and second optical portions and that their areas become gradually smaller as they get closer to each section from the vicinity of the border.

9. The back light device of a liquid crystal display device as defined in claim 1, wherein:

said light guiding body includes transmitting portions and reflecting portions on a light emitting face, said transmitting portions for transmitting a light and said reflecting portions for reflecting a light toward a reflecting face, said transmitting portions are formed such that their area becomes largest in the vicinity of the border between the first and second optical portions and that their areas become gradually smaller as the transmitting portions get closer to each section from the vicinity of the border.

10. The back light device of a liquid crystal display device as defined in claim 1, further comprising grains for scattering a light in said light guiding body, wherein said grains for scattering a light are arranged such that their density becomes highest in the vicinity of the border of the first and second optical portions and that their density becomes gradually smaller as the grains get closer to each section from the vicinity of the border.

11. The back light device of a liquid crystal display device as defined in claim 1, further comprising a reflecting member for returning a emitted light through said light guiding body into said light guiding body on the outside of a reflecting face of said light guiding body.

12. A back light device of a liquid crystal display device, comprising:

light sources; and a light guiding body made of a light transmitting material for guiding a light emitted from said light source so that the light is emitted towards a liquid crystal display panel, wherein at least one of said light sources is positioned just under a display area of a liquid crystal panel so as to be laid behind the back face of said light guiding body, wherein said light guiding body includes sections that intersect a circumferential end of the display area of the liquid crystal panel in the vicinity of the light sources and end faces where light from the light sources enters, either of said section and said face in the vicinity of each light source that is closer to the central portion of the display area being incident end face, one of said incident end face in the vicinity of the light sources where a quantity of incident light is larger being a first incident end face, the other incident end face where a quantity of incident light is smaller being a second incident end face, wherein said light guiding body includes a first optical portion for guiding an incident light from the first incident end face to the vicinity of the center so as to emit the light to the liquid crystal display panel and a second optical portion for guiding an incident light from the second incident end face to the vicinity of the portion so as to emit the light to the liquid crystal display panel, wherein a border between said first and second optical portions is set nearer to the second incident end face according to a ratio of the quantities of incident lights on each incident end face such that a difference in luminance between the first and second optical sections are eliminated.

13. The back light device of a liquid crystal display device as defined in claim 12, further comprising a light shielding member for decreasing the luminance intensity from the light source, that is transmitted through said light guiding body substantially parallel to a normal line of the liquid crystal display panel, said light shielding member being positioned between the a face of a light source laying behind the back face of an extended portion of said light guiding body and the liquid crystal display panel.

14. The back light device of a liquid crystal display device as defined in claim 12, further comprising reflecting means for reflecting the lights from said light sources so as to make the lights enter said light guiding body.

15. The back light device of a liquid crystal display device as defined in claim 12, wherein said light guiding body is formed such that its thickness becomes smallest on the border between the first and second optical portions.

16. The back light device of a liquid crystal display device as defined in claim 12, wherein said light guiding body includes a reflecting face and a light emitting face, said reflecting face having a plane surface, said light emitting face having an inclination so as to come closest to the reflecting face on the border between the first and second optical portions.

17. The back light device of a liquid crystal display device as defined in claim 12, wherein said light guiding body includes a light emitting face and a reflecting face, said light emitting face having a plane surface, said reflecting face having an inclination so as to come closest to said light emitting face on the border between the first and second optical sections.

18. The back light device of a liquid crystal display device as defined in claim 12, wherein:

said light guiding body includes a reflecting face having a scattering/reflecting portion for scattering and reflecting a light, said scattering/reflecting portions are formed such that their area becomes largest in the vicinity of the border between the first and second optical portions and that their areas become gradually smaller as they get closer to each section from the vicinity of the border.

19. The back light device of a liquid crystal display device as defined in claim 12, wherein:

said light guiding body includes transmitting portions and reflecting portions on a light emitting face, said transmitting portions for transmitting a light and said reflecting portions for reflecting a light toward a reflecting face, said transmitting portions are formed such that their area becomes largest in the vicinity of the border between the first and second optical portions and that their areas becomes gradually smaller as the transmitting portions get closer to each section from the vicinity of the border.

20. The back light device of a liquid crystal display device as defined in claim 12, further comprising grains for scattering a light in said light guiding body, wherein said grains for scattering a light are arranged such that their density becomes highest in the vicinity of the border of the first and second optical portions and that their density becomes gradually smaller as the grains get closer to each section from the vicinity of the border.

21. The back light device of a liquid crystal display device as defined in claim 12, further comprising a reflecting member for returning a emitted light through said light guiding body into said light guiding body on the outside of a reflecting face of said light guiding body.

22. A method of back lighting a liquid crystal display device, comprising the steps of:

transmitting light emitted from light sources along a light guiding body towards a liquid crystal display panel, the light guiding body including a first section and a second section receiving different quantities of incident light from the light sources;

guiding light, via a first optical section, from the first section to a central portion of said light guiding body and emitting light to the liquid crystal display panel;

guiding light, via a second optical section, from the second section to the central portion of the light guiding body and emitting light to the liquid crystal display panel; and setting a border between said first and second optical sections according to a ratio of the quantities of incident light on each section such that a difference in luminance between the first and second optical sections are eliminated.

* * * * *